United States Patent [19]

Nicolas

[11] 4,319,805

[45] Mar. 16, 1982

[54] ROTARY SCREEN FOR RECEIVING OPTICAL IMAGES PARTICULARLY ADVERTISING IMAGES

[76] Inventor: Pierre Nicolas, 30, rue Lamartine, 91100 Corbeil-Essonnes, France

[21] Appl. No.: 118,572

[22] Filed: Feb. 4, 1980

[30] Foreign Application Priority Data

Feb. 6, 1979 [FR] France ............................... 79 03002

[51] Int. Cl.³ ...................... G03B 21/56; G09F 13/00; G03B 21/24

[52] U.S. Cl. ...................................... 350/120; 40/436; 353/79

[58] Field of Search ............... 352/3; 353/1, 121, 122, 353/46, 79; 40/436; 350/120

[56] References Cited

U.S. PATENT DOCUMENTS 3,134,299 5/1964 Allen ................................ 353/79 X
3,480,346 11/1969 Reitz et al. .......................... 350/120

*Primary Examiner*—Richard A. Wintercorn
*Attorney, Agent, or Firm*—Hauke and Patalidis

[57] ABSTRACT

A rotary screen mounted in the median area of a preferably spherical enclosure, the rear face of which being made opaque except in its central portion, while its front face is perfectly transparent, a projector being placed rearwardly of the enclosure in central axis of the portion which is not opaque in order to enable light rays from the prospector to pass through the enclosure to reach the rotary screen.

5 Claims, 3 Drawing Figures

ROTARY SCREEN FOR RECEIVING OPTICAL IMAGES PARTICULARLY ADVERTISING IMAGES

BACKGROUND OF THE INVENTION

Screens for receiving optical images, particularly for advertising purposes are already known, and these screens are made by surfaces fixedly or movably mounted within cylindrical or spherical volumes.

Actually French Pat. No. 70-44060 (publication No. 2,116,789) discloses a screen forming surface mounted within a cylindrical volume, this screen being transparent and receiving directly or through a set of mirrors an image coming from a projector in order to exhibit an enlarged image on the screen.

French certificate of addition No. 74-10774 (publication No. 2,266,249) shows a translucent screen mounted within a sphere. The screen is of a circular shape, rotates on itself and receives from a projector an image which, because the screen rotates, begins with a given magnitude, extends, contracts and then disappears.

In the two above mentioned disclosures, the images are obtained from transparencies, but it is also possible to use other elements such as camera films with a discontinuous feeding.

Yet, all the above embodiments are not satisfactory since the projection of these images in volumes, although it is attractive, is nevertheless not very visible, more particularly when placed in full daylight or in well lighted rooms.

Besides, the apparatus made until now are bulky and do not enable practical arrangements, for example, by suspending the screen in its housing at a certain distance from the projector.

SUMMARY

The present invention overcomes these disadvantages by providing a rotary screen for receiving optical images, particularly advertising images, the screen translucent and able to rotate on itself, being mounted in the median area of a spherical volume or enclosure the rear face of which is made opaque except in its central portion, while its front face is perfectly transparent, a projector being placed rearwardly of the spherical enclosure in central axis of the portion which is not opaque in order to enable light rays from the projector to pass through the spherical enclosure to reach the rotary screen.

Various further features of the invention will be moreover revealed from the detailed following disclosure.

An embodiment of the invention is shown as a non limitative example in the accompanying drawings, wherein:

DETAILED DESCRIPTION OF THE PREFERRED EMBODIMENTS

Figure 1:
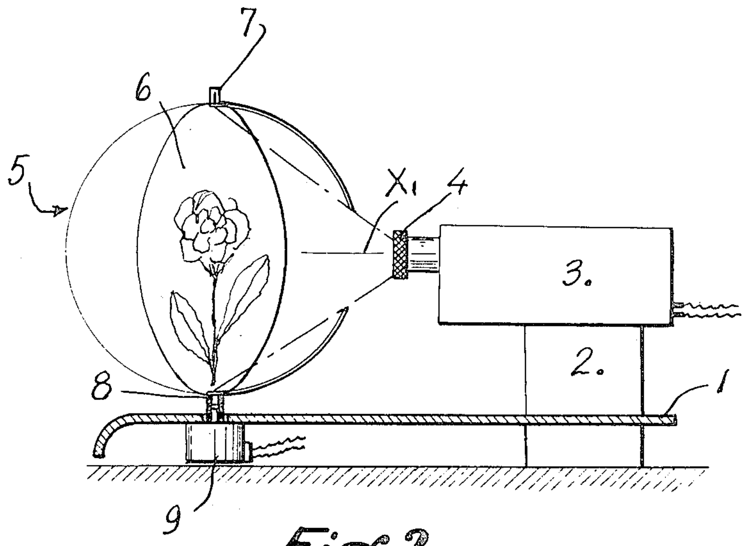
FIG. 1 is a diagramatic perspective view of a rotary screen mounted within a sphere, according to the present invention.

In FIG. 1, the assembly comprising the movable screen for receiving optical images comprises essentially a support 1 at the rear part of which is mounted a fixing means 2 for a projector 3 which, preferably is a projector for transparencies. As shown in FIG. 1, the axis $X_1$ of the optical means or lens 4 of the projector 3 coincides exactly with the horizontal median axis of a sphere 5 made of two identical half-parts in order to enable positioning within the sphere of translucent screen 6 of a circular shape and comprising diametrically opposed pivot means 7 and 8 mounted in bearings provided for that purpose on the sphere 5. Therefore, by means of an electric motor 9 the motor shaft of which is the pivot means 8, the screen 6 can rotate on itself within the sphere 5. Obviously, the motor 9 is connected to electronic synchronizing means enabling to control, on the one hand, switching-on and -off of the projector 3 and, on the other hand, the change of the transparencies so that an image is projected when the screen 6 is at a beginning of a revolution and that this image disappears when the screen reaches at the end of the revolution. In some cases the screen may be made to stop some time in the position at which the image is best seen.

Figure 2:
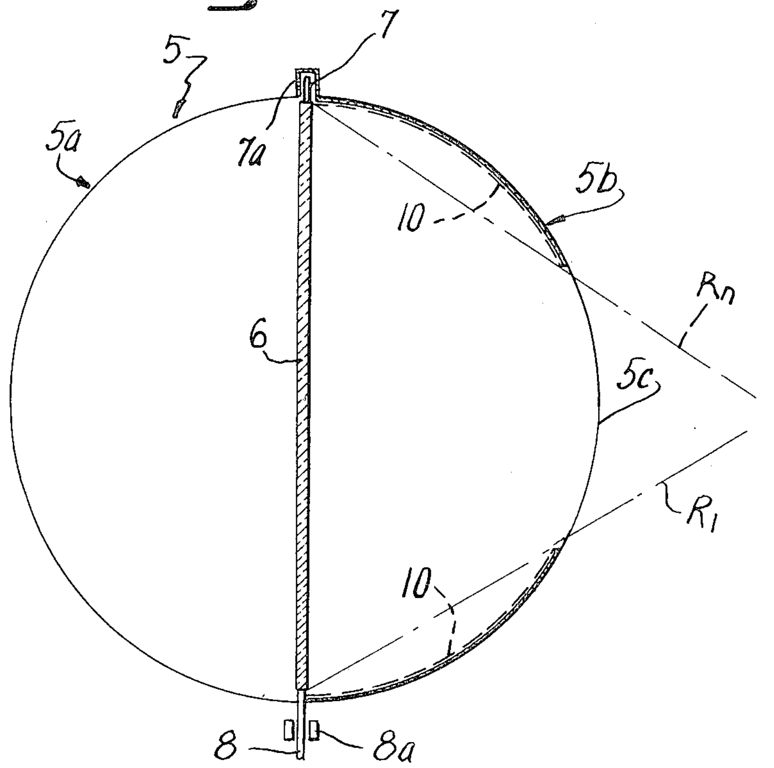
FIG. 2 is an enlarged perspective view of the sphere enclosing the rotatable screen.

As shown both in FIG. 1 and in FIG. 2, the sphere 5 is divided into two identical portions 5*a* and 5*b*, but, while the portion 5*a* is perfectly transparent, the portion 5*b* is made opaque by a dark inner film 10 on all the surface of the portion 5*b* except its central area 5*c* having the shape of a spherical sector, and through which pass the light rays $R_1 \ldots R_n$ of the image coming from the projector 3. Thus, because of the opacity of the greater part of the inner face of the sphere 5, the image projected on the screen 6 is perfectly visible, very sharp, and therefore very attractive, even when the screen 6, mounted within the sphere 5 is positioned in a very lighted zone, for example in full daylight or in an exhibition room having an intense brightness.

The area 10 can be made opaque either by coating a thin film on the inner side of the half sphere 5*b*, or by any other suitable means as for example by spraying a black varnish compatible with the material of the sphere 5.

In the example shown in the drawings, the projector is placed on the same support 1 as the motor 9 driving the screen 6 in rotation and supporting the sphere 5. Actually, the rotary shaft 8 of the screen 6 is mounted within a socket 8*a* which is fixedly mounted on the support 1 and supports the sphere 5. However the sphere 5 can in some case be supported at a rather great distance from the projector 3. It is then possible to project on the movable screen 6 an image coming from a projector hidden at a certain distance.

Figure 3:
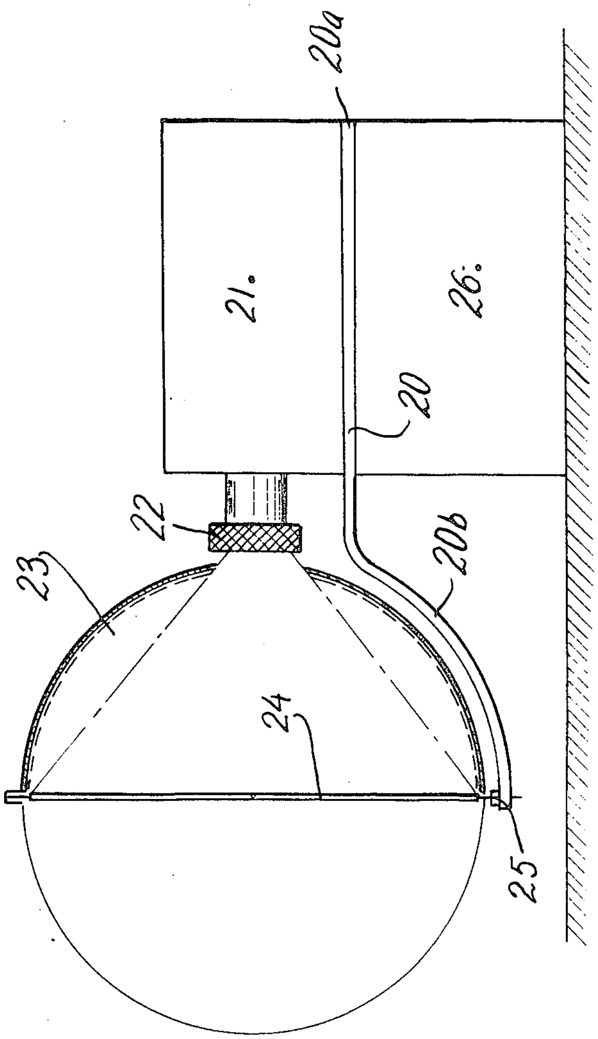
FIG. 3 is a side elevation view, partly in cross section, of a variant of embodiment of the projecting device of the invention.

In FIG. 3, a base 20 is provided with a rear part 20*a* supporting projector 21 having an optical means or lens 22 mounted in close proximity to a sphere 23 containing the rotary screen 24. The sphere 23 is carried by a bearing 25 fixedly mounted on the front arcuate end 20*b* of the base 20 so that the sphere 23 and the rotary screen are suspended and provide an impression of complete lightness. The base 20 is disposed on an element 26 which can be for example a piece of furniture.

The invention is not restricted to the embodiment shown and described in detail since various modifications thereof may be applied thereto without departing from its scope. In particular the coating 10 can be reflecting coating on its side facing the screen 6 in order to increase the brightness of the image.

I claim:

1. A rotary screen for receiving optical images provided by a projector, said screen being a translucent screen rotatable on itself and mounted in median area of a spherical enclosure having a rear face and a front face, said rear face being opaque except in a central transparent portion and said front face being transparent, the projector being mounted rearwardly of said spherical enclosure in center axis of said rear face transparent portion in order to enable light rays from the projector to pass through said transparent portion of said spherical enclosure rear face to reach the screen.

2. The rotary screen of claim 1 wherein the rear face of the spherical enclosure is made opaque by a coating adhering to the rear face of said enclosure.

3. The rotary screen of claim 1 further comprising a support having an arcuate front part supporting in cantilever fashion the spherical enclosure in which is mounted the screen.

4. A rotary screen for receiving optical images provided by a projector, said screen being a translucent screen rotatable on its end mounted in median area of a spherical enclosure having a rear face and a front face, said rear face being opaque except in a central transparent portion and said front face being transparent, the projector being mounted rearwardly of said spherical enclosure in center axis of said transparent portion in order to enable light rays from the projector to pass through said transparent portion of said spherical enclosure rear face to reach the screen, wherein the rear face of the spherical enclosure is made opaque by a coating adhering to the rear face of said enclosure, said coating being a reflecting coating for improving brightness of the images projected by said light rays.

5. The rotary screen of claim 4 further comprising a support having an arcuate front portion supporting in cantilever fashion the spherical enclosure in which is mounted the screen.

* * * * *